US006373973B2

(12) United States Patent
Neri et al.

(10) Patent No.: US 6,373,973 B2
(45) Date of Patent: Apr. 16, 2002

(54) METHOD AND DEVICE FOR CONTROLLING VALUABLE OR SECURITY ITEMS, IN PARTICULAR BANKNOTES

(75) Inventors: Armando Neri, Bologna; Stefano Chini, San Lazzaro Di Savena; Giuseppe Di Stefano, Ferrara, all of (IT)

(73) Assignee: G.D. Societa' per Azioni, Bologna (IT)

( * ) Notice: Subject to any disclaimer, the term of this patent is extended or adjusted under 35 U.S.C. 154(b) by 0 days.

(21) Appl. No.: 09/046,421

(22) Filed: Mar. 23, 1998

(30) Foreign Application Priority Data

Mar. 28, 1997 (IT) ....................................... BO97A0185

(51) Int. Cl.[7] ................................................ G06K 9/00

(52) U.S. Cl. ....................... 382/135; 382/294; 209/534; 356/71

(58) Field of Search ................................ 382/135, 209, 382/217, 218, 219, 195, 283; 194/205, 206, 207; 209/534; 235/379, 380; 356/71

(56) References Cited

U.S. PATENT DOCUMENTS

| | | | | |
|---|---|---|---|---|
| 4,131,879 A | | 12/1978 | Ehrat | 340/146.3 |
| 4,143,279 A | * | 3/1979 | Ehrat et al. | 250/556 |
| 4,273,045 A | | 6/1981 | Crowley | 101/181 |
| 4,879,000 A | | 11/1989 | Gausa | 162/198 |
| 4,905,296 A | | 2/1990 | Nishihara | 382/42 |
| 5,020,110 A | | 5/1991 | Chominski | 382/7 |
| 5,668,897 A | * | 9/1997 | Stolfo | 382/135 |

FOREIGN PATENT DOCUMENTS

| | | |
|---|---|---|
| AU | 199648052 | * 10/1996 |
| EP | 0734863 | 10/1996 |

OTHER PUBLICATIONS

WPAT English Abstract of EP 0734863 of Oct., 1996.

Gregory Bates, Digital Image Processing Principales and Applications, 1994.*

* cited by examiner

*Primary Examiner*—Samir Ahmed
(74) *Attorney, Agent, or Firm*—Ladas & Parry

(57) ABSTRACT

A method of controlling printed items, in particular banknotes, involving two printing stages, the method including the steps of acquiring a controlled-item image; acquiring from the controlled-item image a deviation value between images printed in the two printing stages; acquiring a specimen-item image having the aforementioned deviation value; and comparing the controlled-item image with the specimen-item image; the specimen-item image being selected from a number of images memorized beforehand in a specimen image memory.

4 Claims, 5 Drawing Sheets

METHOD AND DEVICE FOR CONTROLLING VALUABLE OR SECURITY ITEMS, IN PARTICULAR BANKNOTES

BACKGROUND OF THE INVENTION

The present invention relates to a method and device for controlling printed valuable or security items, in particular banknotes.

For example, the invention may be used for controlling postage stamps, treasury bonds, postal orders, identity papers, passports, and any item, in general, printed using methods in which the various printing steps cannot be performed in line with one another, and the printing quality of which is to be controlled. In the following description, reference is made purely by way of example to banknotes.

As is known, banknotes are produced from special sheets (typically comprising watermarks and/or metal bands) large enough to accommodate several finished banknotes, and, which are subjected to various printing steps, using different printing methods, to obtain the various graphic and alphanumeric characters.

More specifically, printing may comprise some or all of the following steps:

a) Offset printing. This is performed out of line with the edge of the sheet, which therefore cannot be used as a reference by which to determine the coordinates of the offset-printed details. Offset printing is normally performed on both sides of the sheet.

b) Copperplate printing. This is performed at high pressure, may be displaced with respect to the offset printing, and slightly deforms the paper, thus possibly resulting in inclination of the copperplate with respect to the offset printing. Copperplate printing may only be performed on the front or both sides (front-back) of the banknote, and may comprise several steps, each of which may be horizontally/vertically misaligned or inclined with respect to the others and with respect to the offset printing.

c) Silk-screen printing. Like copperplate printing, this may be displaced or inclined with respect to the offset printing.

Following the above printing steps, the printed sheet is quality controlled, and only the passed banknotes are printed with serial numbers. Finally, the sheet is cut to separate the banknotes, but cutting is not performed in line with any of the printed details.

Quality control is currently performed manually to ensure the various printed details conform closely enough with an ideal value, and that there are no errors in colouring (too much ink or none at all), no smudges, etc.

At present, there is no way of automatically controlling the print quality of banknotes, in that, to take into account the numerous variables involved, the deviation thresholds used to compare the banknote with a specimen image would have to be so high that even banknotes with serious errors in colouring would be passed.

Automatic control systems do exist for validating, discriminating between, or determining the deterioration of banknotes already in circulation, but which provide for examining only a very small portion of the note (typically a narrow horizontal intermediate strip through significant parts of the overall design). The information supplied by such systems is therefore insufficient for quality control purposes, in which case the inking defects and smudges for detection are normally localized.

SUMMARY OF THE INVENTION

It is an object of the present invention to provide a control method and device enabling reliable, automatic control.

According to the present invention, there is provided a method of controlling valuable or security items, in particular banknotes, characterized by comprising the steps of:

a) acquiring a controlled-item image;

b) acquiring a predetermined characteristic of said controlled-item image;

c) acquiring a specimen-item image having said predetermined characteristic; and d) comparing said controlled-item image with said specimen-item image.

According to the present invention, there is also provided a device for controlling banknotes, characterized by comprising first acquisition means for acquiring a controlled-item image; second acquisition means for acquiring a predetermined characteristic of said controlled-item image; third acquisition means for acquiring a specimen-item image having said predetermined characteristic; and comparing means for comparing said controlled-item image with said specimen-item image.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
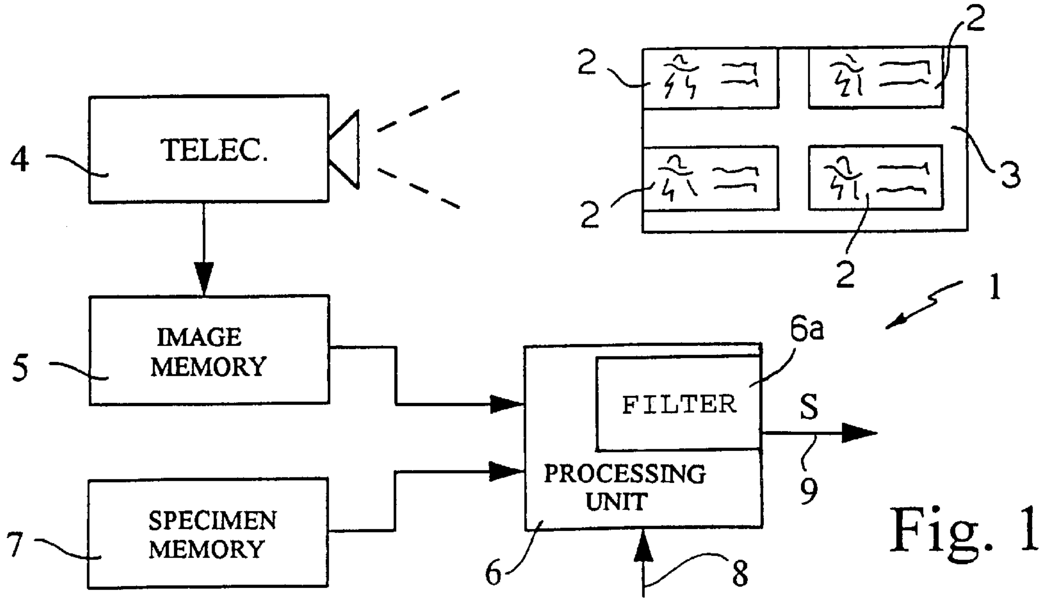
FIG. 1 shows an overall block diagram of the device according to the present invention.

Numeral 1 in FIG. 1 indicates as a whole a device for quality controlling banknotes 2 printed on a sheet 3.

Control device 1 comprises a television camera 4 for picking up one banknote at a time, and for generating and supplying a digitized discrete grey-tone television signal to an image memory 5. Image memory 5 memorizes the image of banknote 2 in the form of a matrix of dots (pixels), each of which is assigned a value related to the grey level (luminance) of the pixel.

Image memory 5 is connected to a processing unit 6—preferably comprising an image processing section (image processor) and a logic section—for processing the image of banknote 2 to extract predetermined characteristics of the image, determining a specimen banknote having said predetermined characteristics, and comparing the image of the banknote with said given specimen banknote. For which purpose, processing unit 6 comprises a convolution filter 6*a*, and is connected to a specimen memory 7, the structure of which may vary according to how the specimen banknote/s is/are generated, as explained later on. Processing unit 6 also comprises an input 8 for receiving external data and commands as explained later on; and an output 9 supplying a signal S accepting or rejecting the controlled banknote 2.

Figure 7:
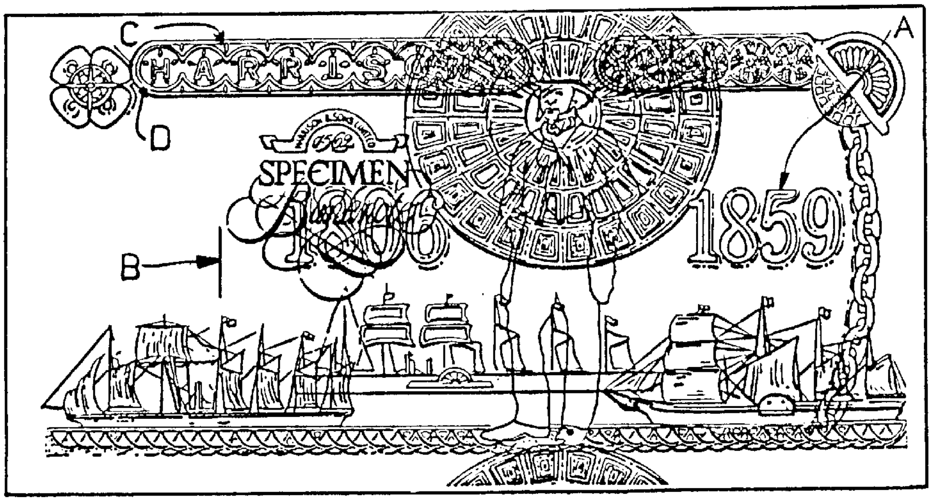
FIGS. 7 to 9 show plan views of images used to implement the method according to the present invention.
Figure 8:
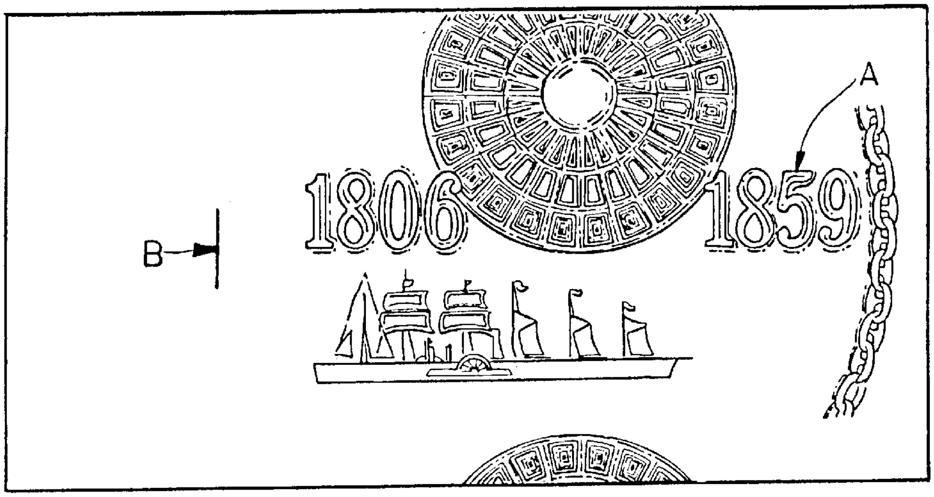

In the examples of the control method described herein, reference is made to a banknote involving one offset printing stage and one copperplate printing stage, and the predetermined characteristics by which to determine the specimen banknote for comparison with the controlled banknote are defined by the horizontal deviation D1 and vertical deviation D2 of the copperplate with respect to the offset printing. FIG. 7 shows an example of one face of a banknote 2 of the above type, which is obtained by superimposing the FIG. 8 offset specimen and the FIG. 9 copperplate specimen.

As described in detail below, the method according to the present invention is based on determining the deviation between the offset and copperplate images of the controlled banknote, and comparing the controlled banknote with a specimen banknote having the determined deviation. Consequently, banknotes with different deviation values are compared with different specimen banknotes.

For example, assuming maximum horizontal and vertical deviations 1 mm between the offset and copperplate images, and that specimens are obtained by moving the copperplate with respect to the offset image each time by 0.25 mm horizontally (both left and right) and/or vertically (both up and down), 81 different specimen banknotes will be obtained, including the nominal specimen (zero offset-copperplate error or deviation with respect to the nominal banknote). As explained in detail below, the specimen banknotes may be generated and memorized in specimen memory 7 before controlling the banknotes, or be generated one at a time during control, according to the deviation on the banknote.

Figure 2:
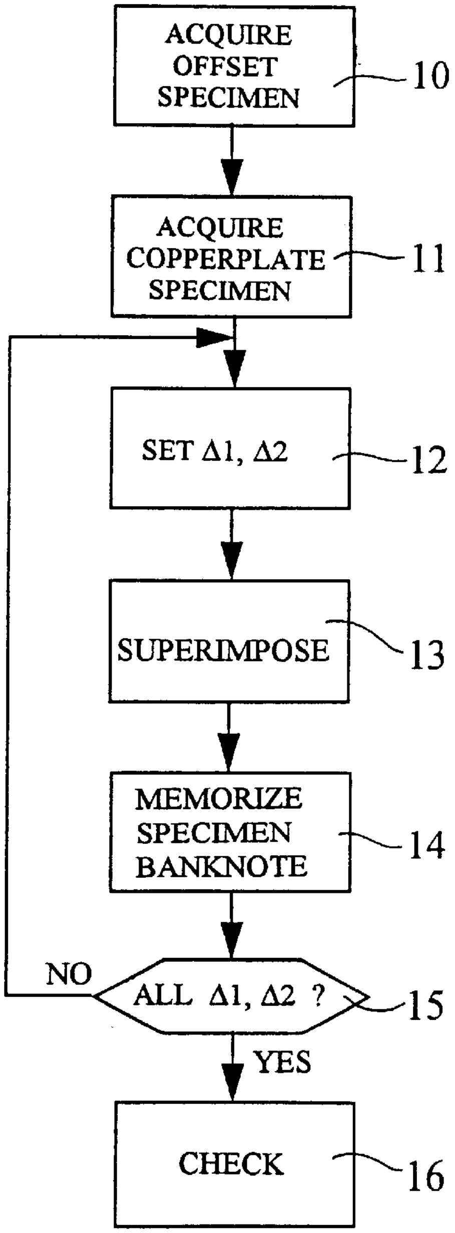
FIG. 2 shows a flow chart of a first embodiment of the method according to the present invention.
Figure 3:
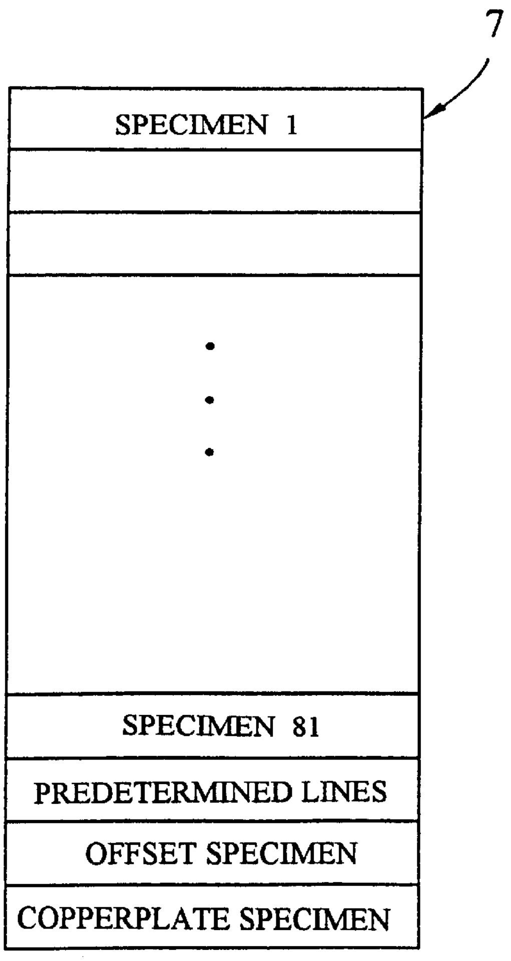
FIG. 3 shows a simplified diagram of an element of the FIG. 1 device implementing the FIG. 2 method.

FIG. 2 shows a first embodiment of the control method, in which processing unit 6 generates the images of all the specimens prior to commencing the control step. In which case, the specimen memory may be structured as shown in FIG. 3, and comprise 85 sections 81 each containing a specimen banknote image; one containing the controlled banknote image; one containing the copperplate image; one containing the offset image; and one containing the parameters (e.g. coordinates) for identifying characteristic lines, in the nominal print image, by which to determine the offset-copperplate deviation.

With reference to FIG. 2, device 1 first acquires the offset specimen image and memorizes it in specimen memory 7 (block 10). The image is preferably acquired by entering the offset specimen pixel values externally via input 8 of processing unit 6, or may be acquired by means of camera 4. In the same way, device 1 then acquires the copperplate specimen image and memorizes it in specimen memory 7 (block 11).

Device 1 then sets a first combination of horizontal and vertical deviations D1 and D2 of the copperplate with respect to the offset image (block 12), and superimposes the copperplate image on the offset image (retrieved from memory 7) with the set deviation combination (block 13). The specimen banknote so generated is then memorized in a special section of memory 7 (block 14). If the specimen banknote images have not all been generated with the various horizontal D1 and vertical D2 deviation combinations (NO output of block 15), the above procedure (blocks 12–14) is repeated. Conversely (YES output of block 15), the banknote quality control procedure—indicated schematically by block 16 in FIG. 2 and described below with reference to FIG. 4—is commenced.

Figure 4:
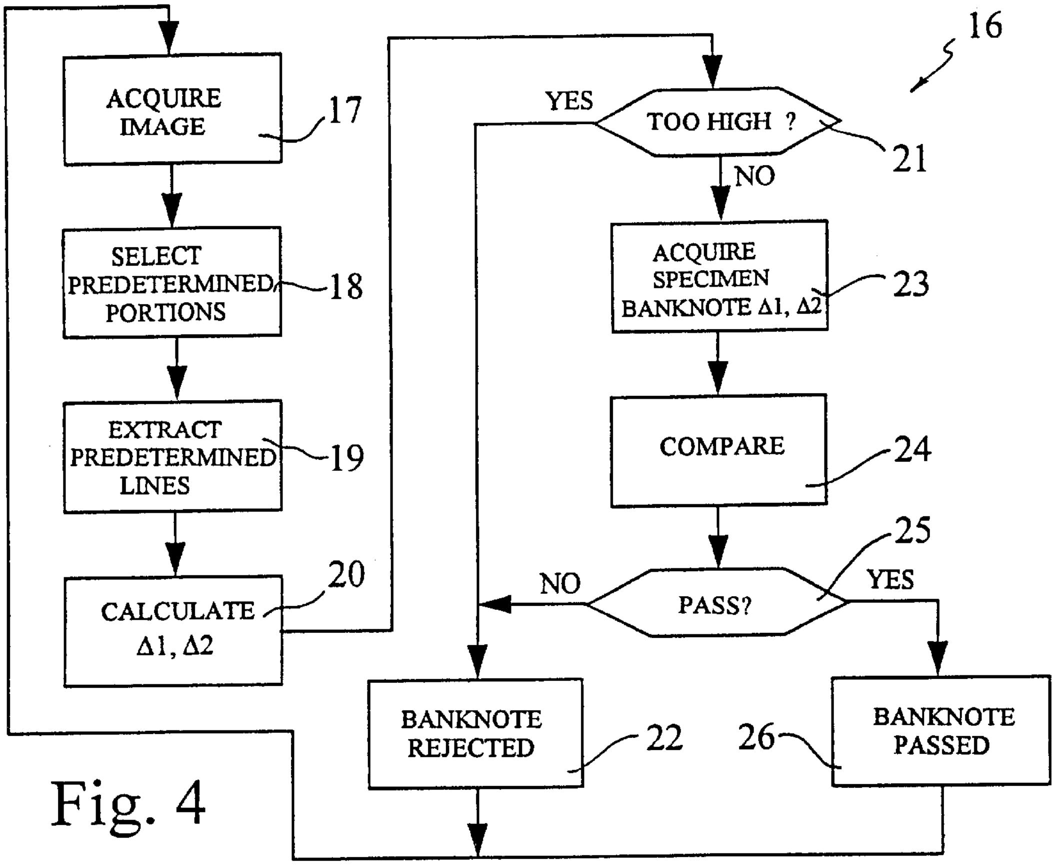
FIGS. 4 to 6 show flow charts of different embodiments of the method according to the present invention.
Figure 9:
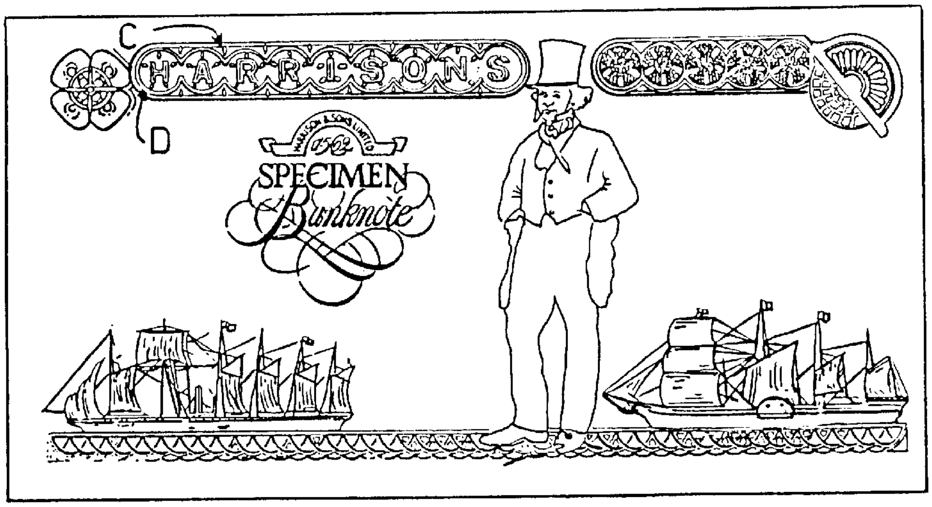

As shown in FIG. 4, control of the banknote comprises a first step of acquiring and memorizing the image of a whole banknote by means of camera 4 and image memory 5 (block 17). From the acquired image (block 18), processing unit 6 selects a number of small predetermined regions containing predetermined significant details of the banknote, taking into account any position inaccuracy resulting from displacement of the banknote with respect to the theoretical position, and from deviations in printing as described above. For example, the predetermined regions may be such as to definitely contain the edge portions indicated by horizontal lines A and C and vertical lines B and D in FIG. 7, and corresponding to a horizontal edge portion and a vertical edge portion of the offset image (FIG. 8) and a horizontal edge portion and a vertical edge portion of the copperplate image (FIG. 9).

The selected predetermined regions of the camera image are processed by convolution filter 6*a* —e.g. a known edge-detection 3×3 kernel filter—to extract the above significant details (lines A–D) of the banknote (block 19); and processing unit 6 then calculates horizontal deviation D1 and vertical deviation D2 by comparing the positions of the extracted significant details (lines A–D) with the reference positions, memorized in specimen memory 7, of the same significant details on the specimen banknote, i.e. by calculating the distance between the pairs of horizontal lines A and C and the distance between the pairs of vertical lines B and D, and the error with respect to the same distances on the nominal banknote (block 20).

Processing unit 6 then determines whether the calculated deviations are acceptable or above the permissible maximum values (1 mm, as indicated). If the deviation is unacceptable (YES output of block 21), a signal rejecting the banknote is generated (block 22); if the deviation is within the predetermined limits (NO output), processing unit 6 acquires from specimen memory 7 the image of the specimen banknote having the same deviations D1 and D2 as those detected on the controlled banknote, or whose discrete values of such deviations are closest to the detected values (block 23). Processing unit 6 then compares the controlled banknote with the specific specimen banknote acquired (block 24). Since, for technical reasons involving the camera, the individual pixels of the acquired image of the controlled banknote may not be altogether accurate, the above comparison, as opposed to being performed pixel by pixel, may advantageously be performed on the basis of the mean pixel values of predetermined regions into which the banknote is divided. In which case, the image of controlled banknote 2 may advantageously be processed by means of a local averaging operating just prior to comparison, and the images of the specimen banknotes may be processed prior to memorization (block 14 in FIG. 2).

If the banknote is considered acceptable (YES output of block 25), a pass signal is generated (block 26); conversely (NO output), a reject signal is generated (block 22); which signals may then be used to print the serial numbers (which, as stated, are only printed on the passed banknotes) and for separating the passed banknotes from the rejects when sheet 3 is cut.

In the FIG. 5 embodiment, the specimen banknote images with different D1 and D2 deviation combinations are acquired from the controlled banknotes themselves, as described below. In which case, specimen memory 7 does not have the offset and copperplate specimen memorizing sections shown in FIG. 3.

Figure 5:
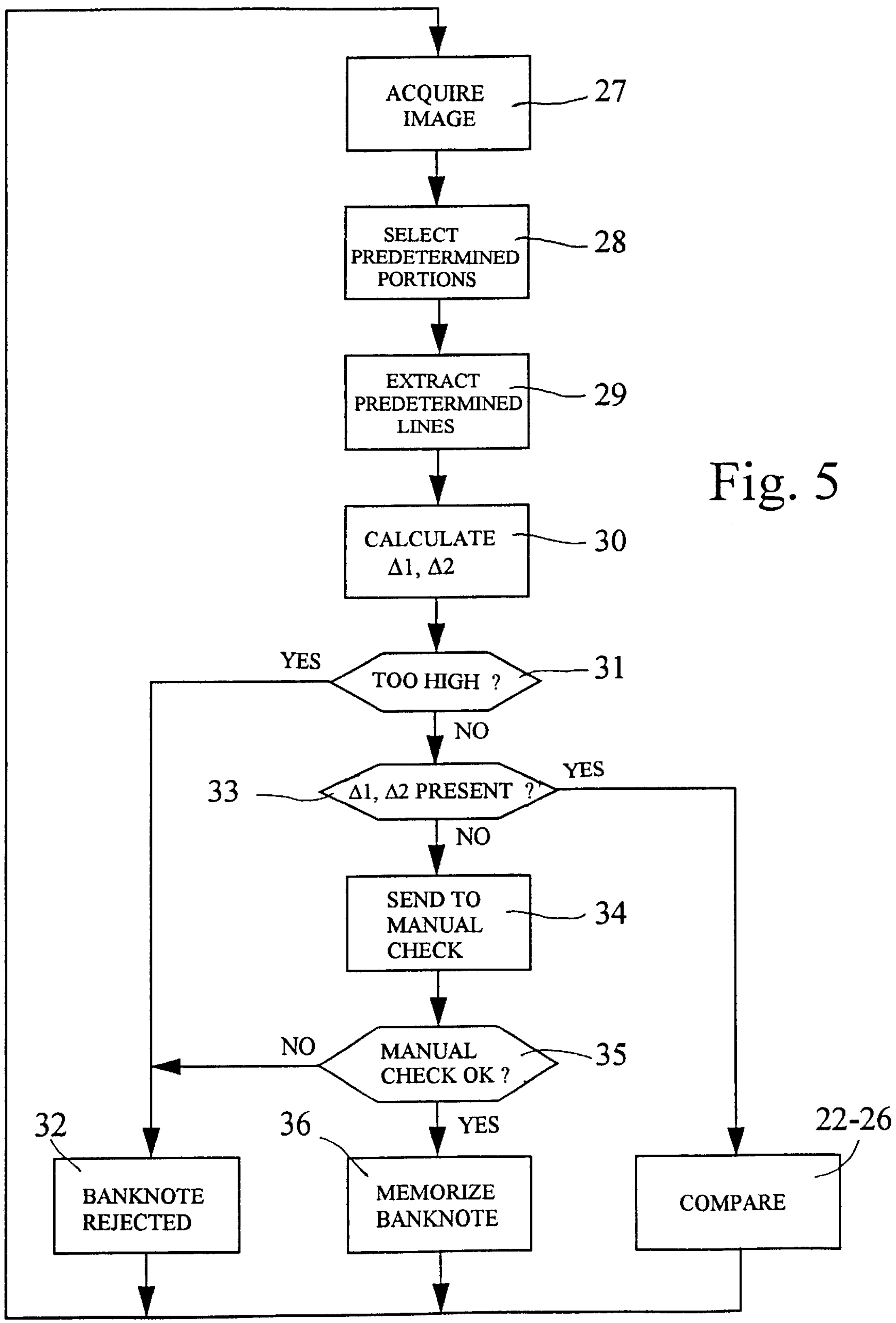

As shown in FIG. 5, control of the banknote comprises the same initial steps as in FIG. 4. That is, the image of a whole controlled banknote is first acquired and memorized by means of camera 4 and image memory 5 (block 27). Processing unit 6 then selects (block 28) from the acquired image the predetermined regions containing predetermined significant details of the banknote; processes the selected predetermined regions of the camera image to extract the significant details of the banknote (block 29); calculates horizontal deviation D1 and vertical deviation D2 (block 30) determines whether the calculated deviations are acceptable or not (block 31) and generates a signal rejecting the banknote (block 32) if the deviation is unacceptable (YES output of block 31). If the deviation is within the predetermined limits (NO output), processing unit 6 determines whether the specimen banknote having said deviations D1 and D2 has already been loaded (block 33). If it has (YES output), the processing unit acquires the corresponding specimen banknote and performs the comparison as in blocks 22–26 in FIG. 4. Conversely (NO output of block 33), processing unit 6 generates a send-to-manual-check signal (block 34) and awaits the response of the operator.

The operator then examines the banknote to determine whether the quality is such as to be usable as a specimen, and supplies processing unit 6, via input 8 in FIG. 1, with a signal confirming or rejecting the quality of the banknote. As soon as processing unit 6 receives this signal, it checks whether the manual check had a positive outcome (YES output of block 35), in which case processing unit 6 memorizes the processed image in the section of specimen memory 7 for detected deviation values D1 and D2 (block 36). Conversely, the processing unit generates a signal rejecting the banknote (block 32) and commences checking the next banknote. The procedure may comprise a further step (not shown) of determining whether all 81 specimen banknotes corresponding with the permissible deviation levels have been memorized; and may comprise the step, once the specimen banknotes have been loaded, of directly activating the banknote checking procedure (block 16) after determining acceptance of the detected deviations (NO output of block 31).

In the FIG. 6 embodiment, as opposed to acquiring all the specimen banknote images with different permissible D1 and D2 deviation combinations (constructed beforehand from offset and copperplate specimens or by scanning acceptable banknotes), the specific specimen banknote with the detected D1 and D2 deviations is constructed each time on the basis of the deviation detected on the controlled banknote, as described below. In which case, specimen memory 7 only comprises the sections for memorizing the offset and copperplate specimens of the controlled banknote, and the image of each specimen banknote as it is constructed.

Figure 6:
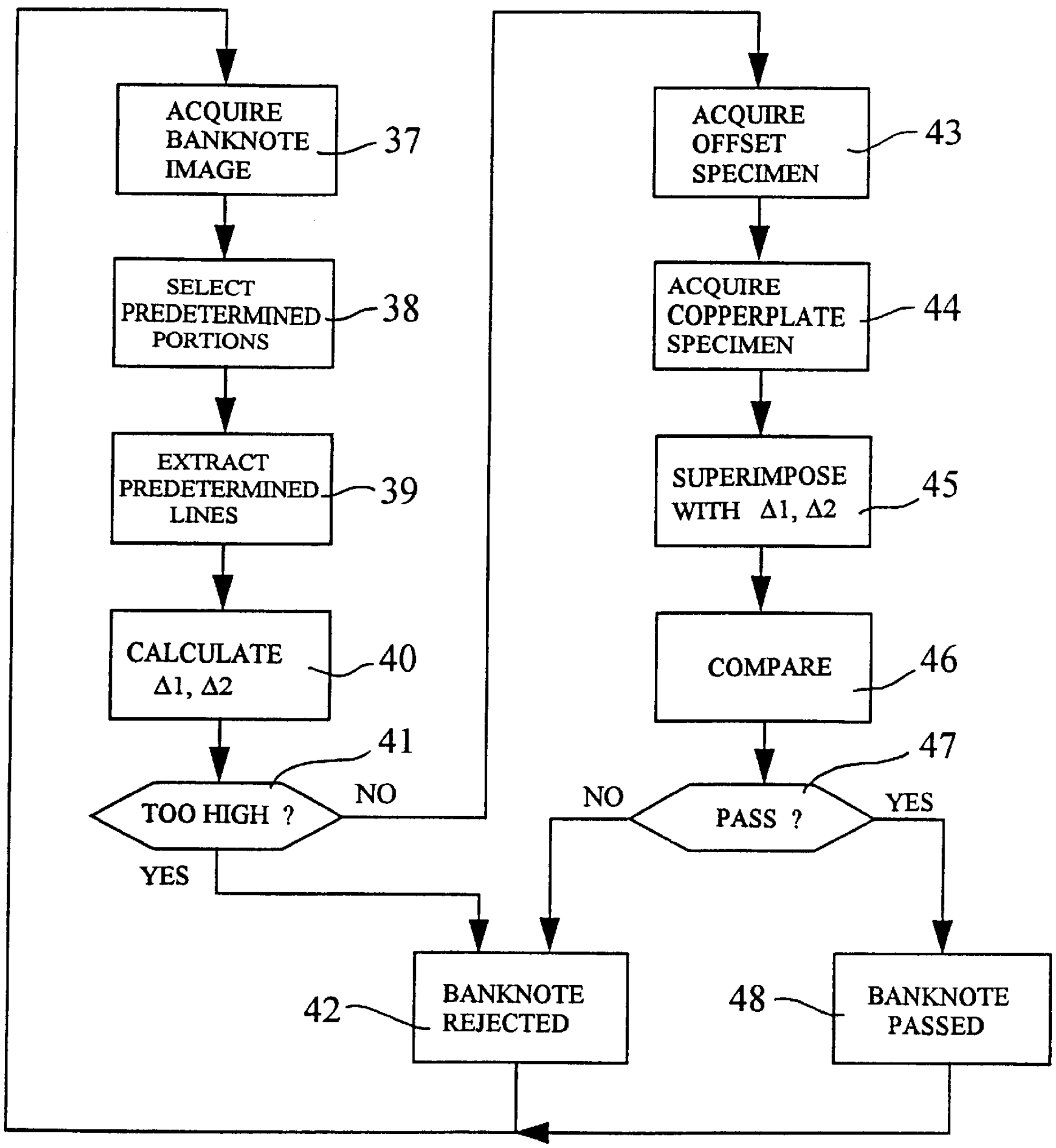

As shown in FIG. 6, control of the banknote comprises the same initial steps as in FIG. 5. That is, the image of a whole controlled banknote is first acquired and memorized by means of camera 4 and image memory 5 (block 37). Processing unit 6 then selects (block 38) from the acquired image the predetermined regions containing predetermined significant details of the banknote; processes the selected predetermined regions of the camera image to extract the significant details of the banknote (block 39); calculates horizontal deviation D1 and vertical deviation D2 (block 40); determines whether the calculated deviations are acceptable or not (block 41); and generates a signal rejecting the banknote (block 42) if the deviation is unacceptable (YES output of block 41). If the deviation is within the predetermined limits (NO output), processing unit 6 acquires the offset specimen image from specimen memory 7 (block 43); acquires the copperplate specimen image from specimen memory 7 (block 44); and superimposes the offset and copperplate specimens on the basis of the deviations D1 and D2 detected on the banknote (block 45).

In this case also, processing unit 6 may process the superimposed image or the controlled banknote image by locally averaging their pixel values; and then compares the processed images (block 46). If the banknote is considered acceptable (YES output of block 47), a pass signal is generated (block 48); conversely (NO output), a reject signal is generated (block 42).

What is claimed is:

1. A method of controlling printed valuable or security items, each item carrying at least first and second superimposed printing, comprising two partial images which are printed in different printing steps, said method comprising the steps of:

a) storing at least a first specimen partial image of said first printing and a second specimen partial image of said second printing;

b) acquiring a controlled-item image having predetermined significant details of said first printing and of said second printing;

c) determining at least one deviation value of said predetermined significant details in said controlled-item image;

d) rejecting the controlled-item image when said at least one deviation value is outside a predetermined permissible range;

e) acquiring a specimen-item image having the same value of the at least one deviation value, when said at least one deviation value is inside said predetermined permissible range; and f) comparing said controlled-item image with said specimen-item image; the step of acquiring a specimen-item image comprising the steps of:

e1) acquiring said first specimen partial image and said second specimen partial image;

e2) constructing a respective specimen-item image for each controlled-item image by superimposing said first specimen partial image and said second specimen partial image on the basis of the determined at least one deviation value in said controlled item image.

2. A method as claimed in claim 1, wherein said step of determining at least one deviation value comprises the steps of determining at least one distance between said predetermined significant details; and calculating an error between the determined said distance and a nominal distance.

3. A method as claimed in claim 1, wherein said step of determining at least one distance comprises the steps of acquiring predetermined portions of said controlled-item image; and processing said predetermined portions to highlight said predetermined significant details in said predetermined portions.

4. A method as claimed in claim 3, wherein said predetermined significant details comprise predetermined significant lines; said step of processing said predetermined portions comprise the step of filtering said predetermined portions by means of an edge-detection convolution filter to identify at least one pair of predetermined significant lines; said step of determining at least one distance comprises the step of calculating the distance between said at least one pair of predetermined significant lines.

* * * * *